United States Patent
Taki et al.

(10) Patent No.: US 12,073,203 B2
(45) Date of Patent: Aug. 27, 2024

(54) CONTROL SYSTEM, MOVABLE OBJECT, CONTROL METHOD, AND COMPUTER READABLE STORAGE MEDIUM

(71) Applicant: HONDA MOTOR CO.,LTD., Tokyo (JP)

(72) Inventors: Tomoaki Taki, Tokyo (JP); Yosuke Shionoya, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 201 days.

(21) Appl. No.: 17/560,302

(22) Filed: Dec. 23, 2021

(65) Prior Publication Data
US 2022/0222057 A1    Jul. 14, 2022

(30) Foreign Application Priority Data
Jan. 13, 2021 (JP) ................................ 2021-003346

(51) Int. Cl.
*G06F 8/65* (2018.01)
*G07C 5/00* (2006.01)
*G07C 5/08* (2006.01)

(52) U.S. Cl.
CPC .............. *G06F 8/65* (2013.01); *G07C 5/008* (2013.01); *G07C 5/0808* (2013.01); *G07C 5/0825* (2013.01)

(58) Field of Classification Search
CPC ........................................................ G06F 8/65
See application file for complete search history.

(56) References Cited

U.S. PATENT DOCUMENTS

| | | | |
|---|---|---|---|
| 6,225,898 B1* | 5/2001 | Kamiya ................ G07C 5/008 340/505 |
| 2012/0221188 A1* | 8/2012 | Kelly, III ............... B60K 35/00 701/418 |
| 2016/0210131 A1* | 7/2016 | Vangelov ................ H04L 67/12 |
| 2018/0025067 A1* | 1/2018 | Tsuchihashi .......... G06F 16/275 707/610 |
| 2018/0347533 A1* | 12/2018 | Tamane .............. F02N 11/0807 |
| 2018/0374286 A1* | 12/2018 | Kim ........................ H04L 43/50 |
| 2019/0053000 A1* | 2/2019 | Filippou .................. G08G 1/00 |
| 2021/0117177 A1* | 4/2021 | Noda .................. B60R 16/0231 |
| 2021/0191661 A1 | 6/2021 | Harata |

FOREIGN PATENT DOCUMENTS

JP           2020027666 A      2/2020

* cited by examiner

*Primary Examiner* — Jae U Jeon

(57) ABSTRACT

A control system includes a movable object control unit configured to control a movable object, an update control unit configured to control a program update of the movable object control unit, and a communication path that is a path for the movable object control unit and the update control unit to perform an information communication, a path that is connected to an external diagnosis apparatus configured to perform a diagnosis of the movable object control unit and used for transmitting information of the movable object to the external diagnosis apparatus and the communication path are at least partially in common, and the control system includes a restriction control unit configured to restrict, when the program update and the diagnosis of the movable object control unit by the external diagnosis apparatus are to be performed, one of the diagnosis by the external diagnosis apparatus and the program update.

20 Claims, 11 Drawing Sheets

| ID | VERSION | IDENTIFICATION INFORMATION |
|---|---|---|
| ECU0 | 2.0 | 110000 |
| ECU1 | 1.1 | 210000 |
| ... | ... | ... |

FIG.3

CONTROL SYSTEM, MOVABLE OBJECT, CONTROL METHOD, AND COMPUTER READABLE STORAGE MEDIUM

The contents of the following Japanese patent application(s) are incorporated herein by reference:
NO. 2021-003346 filed in JP on Jan. 13, 2021.

BACKGROUND

1. Technical Field

The present invention relates to a control system, a movable object, a control method, and a computer readable storage medium.

2. Related Art

Patent document 1 discloses an ECU capable of rewriting an application program as an ECU for vehicles.

CITATION LIST

Patent Document

Patent document 1: Japanese Unexamined Patent Application, Publication No. 2020-27666

BRIEF DESCRIPTION OF THE DRAWINGS

FIG. 3 illustrates a data structure of management information data stored in an update control unit 220.

DESCRIPTION OF EXEMPLARY EMBODIMENTS

Hereinafter, the present invention will be described by way of embodiments of the invention, but the following embodiments are not intended to limit the invention according to the claims. In addition, not all combinations of features described in the embodiments necessarily have to be essential to solving means of the invention.

Figure 1:
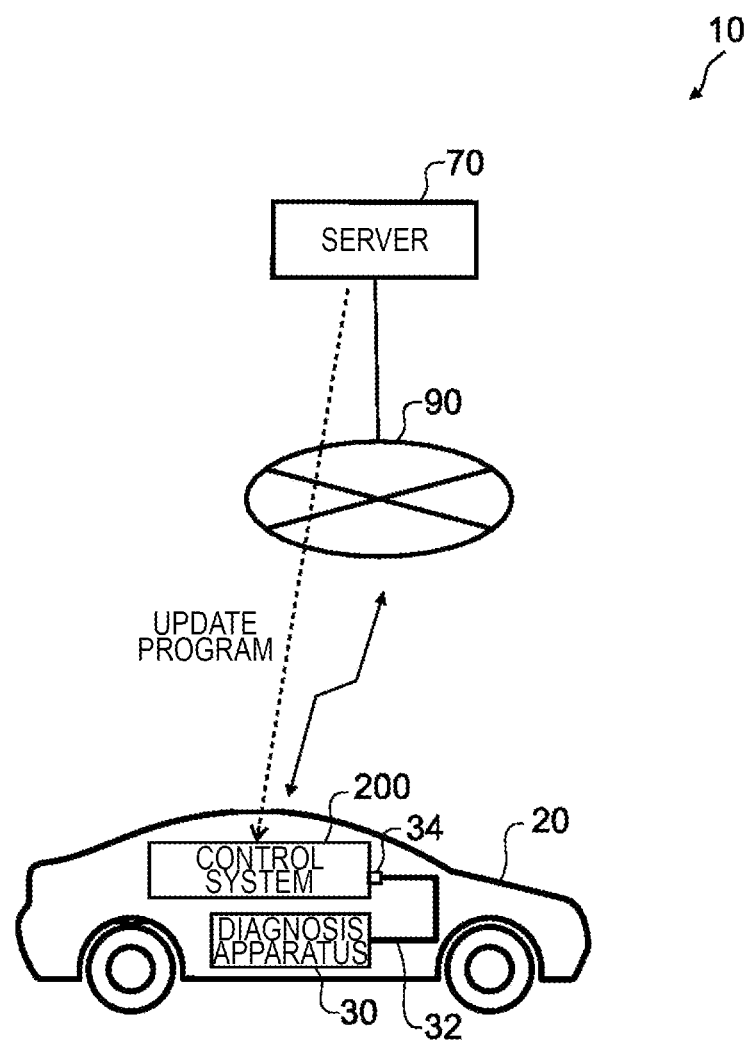
FIG. 1 schematically illustrates an update system 10 according to one embodiment.

FIG. 1 schematically illustrates an update system 10 according to one embodiment. The update system 10 includes a vehicle 20 and a server 70. The vehicle 20 includes a control system 200. The control system 200 is responsible for a control of the vehicle 20 and a communication with the server 70 through a communication network 90. The communication network 90 includes an IP network such as the Internet, a P2P network, a dedicated line including VPN, a virtual network, a mobile communication network, and the like.

In the vehicle 20, the control system 200 includes a plurality of electronic control units (ECUs) configured to perform the control of the vehicle 20. The control system 200 is configured to obtain an update program of the ECU included in the control system 200 from the outside. For example, the control system 200 receives the update program transmitted from the server 70 through the communication network 90 by a wireless communication. The control system 200 is configured to reprogram the ECU included in the control system 200 by the update program. The reprogramming is performed for a purpose of an upgrade of a function of the ECU included in the control system 200, or the like. In this manner, the control system 200 updates the ECU by reprogramming the ECU over the air (OTA). According to the present embodiment, the update of the device such as the ECU by the update program is referred to as a "program update".

The control system 200 includes a diagnosis port 34 configured to connect a diagnosis apparatus 30 thereto. The diagnosis port is, for example, an on board diagnostics (OBD) connector. The diagnosis apparatus 30 is connected to the diagnosis port 34 through a cable 32. The diagnosis port 34 can perform a communication with a plurality of ECUs via a network of the vehicle 20. The diagnosis apparatus 30 is a dedicated scanning tool used in a case, for example, where a dealer or the like performs vehicle maintenance or the like. The dedicated scanning tool is used for collecting information stored in each of the ECUs included in the control system 200 via the network of the vehicle 20. The diagnosis port 34 is prepared while the connection of such a dedicated scanning tool is set as a main purpose. Therefore, when the dedicated scanning tool is connected to the diagnosis port 34 to collect the information, since the information requested by the dedicated scanning tool is developed over the network in the vehicle 20, as compared with a state where the dedicated scanning tool is not connected, the amount of information flowing over the network in the vehicle 20 is diversified. On the other hand, since a commercially available scanning tool is also on the market in addition to the dedicated scanning tool, the commercially available scanning tool may be connected to the diagnosis port 34. In a case where the commercially available scanning tool is connected to the diagnosis port 34, an event may occur in which, when an ECU of a program update target communicates with the commercially available scanning tool, it is not possible for the ECU of the program update target to communicate with another ECU, and the program update may be interfered.

When the program update of the ECU is to be executed, the control system 200 determines whether some sort of the diagnosis apparatus is connected to the diagnosis port 34. When some sort of the diagnosis apparatus is connected to the diagnosis port 34, the control system 200 restricts at least a part of processing associated with the program update of the ECU. For example, the control system 200 stops processing of writing the update program to the ECU, and stops subsequent program update processing. Thus, a probability that the program update is interfered by the commercially available scanning tool or the dedicated scanning tool can be reduced.

Figure 2:
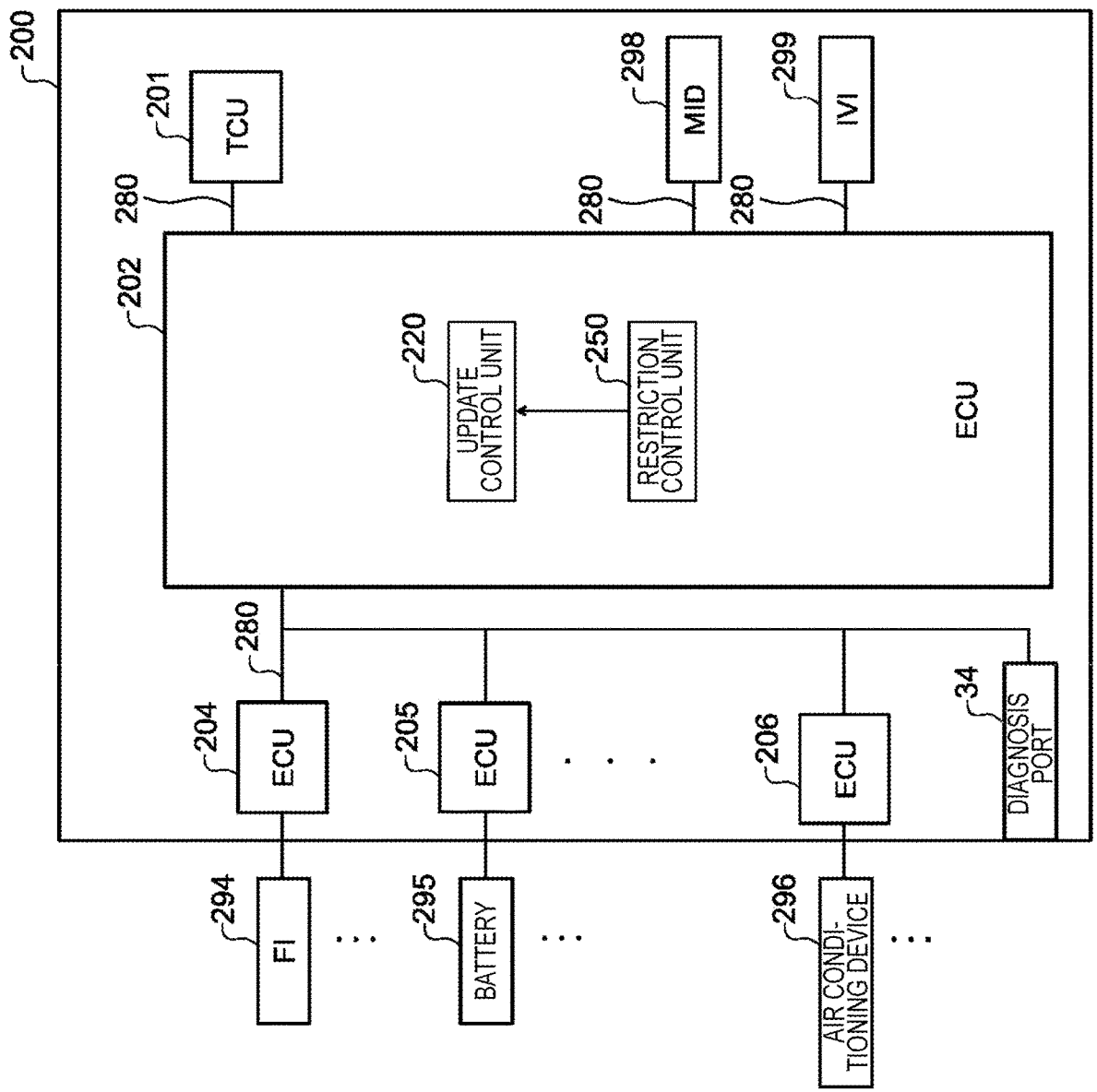
FIG. 2 schematically illustrates a system configuration included in a control system 200.

FIG. 2 schematically illustrates a system configuration included in the control system 200. The control system 200 includes a TCU 201, an ECU 202, an ECU 204, an ECU 205, an ECU 206, an MID 298, an IVI 299, and the diagnosis port 34. In FIG. 2, an FI 294, a battery 295, and an air conditioning device 296 are a device included in the vehicle 20. The FI 294, the battery 295, and the air conditioning device 296 are one example of a controlled device of the vehicle 20.

The ECU 202 is connected to the TCU 201, the ECU 204, the ECU 205, and the ECU 206 through an in-vehicle communication line 280. The ECU 202 performs an information communication with the TCU 201, the ECU 204, the ECU 205, the ECU 206, the MID 298, and the IVI 299 through the in-vehicle communication line 280. The ECU 202 controls the TCU 201, the ECU 204, the ECU 205, the ECU 206, the MID 298, and the IVI 299 in an overall manner. The in-vehicle communication line 280 may be configured by including, for example, a controller area network (CAN), an Ethernet (registered trademark) network, or the like. The in-vehicle communication line 280 is one example of a "communication path" that is a path for performing the information communication.

The TCU 201 is a telematics control unit (TCU). The TCU 201 is mainly responsible for a mobile communication. The TCU 201 transmits and receives data with the server 70 based on the control of the ECU 202. The TCU 201 receives the update program transmitted from the server 70 by the mobile communication based on the control of the ECU 202. The TCU 201 may function as a wireless communication unit.

The MID 298 is a multi information display. The IVI 299 is an in-vehicle infotainment information device (IVI), for example. The MID 298 and the IVI 299 may function as a display control unit. The IVI 299 includes a wireless LAN communication function. The IVI 299 receives the update program transmitted from the server 70 by the wireless LAN communication based on the control of the ECU 202.

The diagnosis port 34 is connected to the diagnosis apparatus 30 configured to perform a diagnosis of the ECU 202, the ECU 204, the ECU 205, the ECU 206, the MID 298, and the IVI 299. The diagnosis port 34 is connected to the in-vehicle communication line 280. When the diagnosis apparatus 30 is connected to the diagnosis port 34, the diagnosis apparatus 30 receives information of the vehicle 20 stored in the ECU 202, the ECU 204, the ECU 205, the ECU 206, the MID 298, and the IVI 299 through the in-vehicle communication line 280. In this manner, a path connected to the diagnosis apparatus 30 and used for transmitting the information of the vehicle 20 to the diagnosis apparatus 30 and the in-vehicle communication line 280 are at least partially in common. It should be noted that the diagnosis port 34 may be connected to the CAN configuring a part of the in-vehicle communication line 280, and the diagnosis apparatus 30 may receive the information of the vehicle 20 by a CAN communication with the ECU 202, the ECU 204, the ECU 205, the ECU 206, the MID 298, and the IVI 299.

Each of the ECU 204, the ECU 205, and the ECU 206 is an ECU serving as a vehicle control unit configured to control the vehicle 20. The ECU 204, the ECU 205, and the ECU 206 are one example of a "movable object control unit". The ECU 204, the ECU 205, and the ECU 206 control various types of devices included in the vehicle 20. For example, the ECU 204 controls the FI 294 that is a fuel injection apparatus, or the like. The ECU 205 controls the battery 295 that is a high voltage battery, or the like. The ECU 206 controls the air conditioning device 296 or the like.

According to the present embodiment, the system configuration is exemplified in which the control system 200 includes the TCU 201, the ECU 202, the ECU 204, the ECU 205, the ECU 206, the MID 298, and the IVI 299, but the system configuration of the control system 200 is not limited to the example of the present embodiment. In addition, according to the present embodiment, as an exemplification, a description will be provided while the movable object control unit that may be set as a target of the program update is the ECU 205, and the ECU 202 functions as an update control unit configured to control the program update. It should be noted that the movable object control unit that may be set as the target of the program update is not limited to the ECU 205. The movable object control unit that may be set as the target of the program update may be any of the TCU 201, the ECU 202, the ECU 204, the ECU 205, the ECU 206, the MID 298, and the IVI 299.

The ECU 202 includes an update control unit 220 and a restriction control unit 250. The program update of the ECU 205 is controlled with the update control unit 220. When the program update and the diagnosis of the ECU 205 by the diagnosis apparatus 30 are to be performed, the restriction control unit 250 restricts one of the diagnosis by the diagnosis apparatus 30 and the program update. For example, when the program update and the diagnosis of the ECU 205 by the diagnosis apparatus 30 are to be performed, the restriction control unit 250 restricts the program update.

When the program update and the diagnosis of the ECU 205 by the diagnosis apparatus 30 are to be performed, the restriction control unit 250 may prohibit the program update until the diagnosis by the diagnosis apparatus 30 is aborted. When the program update and the diagnosis of the ECU 205 by the diagnosis apparatus 30 are to be performed, the restriction control unit 250 may execute a user notification to indicate that the diagnosis by the diagnosis apparatus 30 is to be stopped. A user may be, for example, an occupant of the vehicle 20. The restriction control unit 250 may cause, for example, the MID 298 and the IVI 299 to execute the user notification. For example, the restriction control unit 250 may cause the MID 298 and the IVI 299 to display notification information to the user.

At start up of the vehicle 20, the update control unit 220 may implement a configuration synchronization to obtain, through the in-vehicle communication line 280, management information stored in the ECU 205 that is information including at least a version of the ECU 205 which is necessary to the program update of the ECU 205. For example, when an ignition (IG) power source of the vehicle 20 is turned on, the update control unit 220 may implement the configuration synchronization. When a connection of the diagnosis apparatus 30 to the vehicle 20 is sensed at start up of the vehicle 20, the restriction control unit 250 may prohibit the configuration synchronization until the connection of the diagnosis apparatus 30 is released.

When the connection of the diagnosis apparatus 30 to the vehicle 20 is sensed at start up of the vehicle 20, the restriction control unit 250 may prohibit a reception of an update program of the ECU 205 from a server configured to transmit the update program.

The update control unit 220 may perform a control to receive a presence notification of the update program from the server configured to transmit the update program of the ECU 205. When the connection of the diagnosis apparatus 30 to the vehicle 20 is sensed at start up of the vehicle 20, the restriction control unit 250 may execute a user notification to indicate that the update program is present and a user notification to request for a release of the connection of the diagnosis apparatus 30.

After the connection of the diagnosis apparatus 30 to the vehicle 20 is sensed at start up of the vehicle 20, when the connection of the diagnosis apparatus 30 is released, the restriction control unit 250 may start the reception of the update program from the server.

When the connection of the diagnosis apparatus 30 to the vehicle 20 is sensed during write of the update program to the ECU 205, the restriction control unit 250 may suspend the write of the update program to the ECU 205. When the connection of the diagnosis apparatus 30 to the vehicle 20 is sensed during write of the update program to the ECU 205, the restriction control unit 250 may further execute a user notification to request for the release of the connection of the diagnosis apparatus 30.

Here, the program update will be described. Program update processing in a case where a device set as a target of the program update is an ECU, and a memory for storing firmware of the ECU is a single-bank memory (so called a one-sided ROM) will be described. In this case, since there is a single program storage area for storing the firmware of the ECU, when the ECU operates according to a program stored in the program storage area, it is not possible to write the update program to the program storage area. When the program update of the ECU is to be performed, the update control unit 220 transfers the update program to the ECU and stores the update program in a predetermined data storage area of the ECU, and thereafter instructs the ECU to perform the program update. When the program update is instructed, the ECU executes a control code to perform the program update to write the update program transferred to the data storage area to the program storage area, and activates the update program. The activation of the update program includes processing for setting a startup parameter of the ECU such that, for example, the update program is loaded at start up of the ECU, and a control based on the update program is to be started. It should be noted that when the memory for storing the firmware of the ECU is the single-bank memory, a "state in which the program update of the ECU can be performed" may be a state in which the update program is stored in the predetermined data storage area of the ECU.

Next, program update processing in a case where an internal memory of the ECU is a double-bank memory (so called a double-sided ROM) will be described. In this case, since the ECU has two program storage areas for storing the firmware, when the ECU operates according to a program stored in a first program storage area, the update program can be written to a second program storage area. For example, even while the vehicle 20 is travelling, it is possible to write the update program to the second program storage area, for example. For this reason, when the update program is transferred to the ECU, the update control unit 220 instructs the ECU to write the update program to the second program storage area. When the write of the update program to the second program storage area by the ECU is completed, a state is established in which the program update of the ECU can be performed. When the update control unit 220 is to perform the program update of the ECU, the update control unit 220 instructs the ECU to activate the update program written to the second program storage area. The activation of the update program includes processing for setting the startup parameter of the ECU such that, for example, at start up of the ECU, the update program stored in the second program storage area is loaded, and the control based on the update program is to be started. For example, the activation of the update program includes processing for validating the second program storage area as a read area of the program, and also invalidating the first program storage area as the read area of the program. In this manner, the "program update of the ECU" is a concept including the write of the update program to the program storage area of the ECU. In addition, the "program update of the ECU" is a concept including the activation of the update program written to the program storage area.

According to the present embodiment, a case where the device set as the target of the program update is the ECU 205 will be described. In addition, the internal memory of the ECU 205 is set as the double-bank memory.

FIG. 3 illustrates a data structure of management information data stored in the update control unit 220. When the IG power source of the vehicle 20 is turned on, the update control unit 220 obtains, through the in-vehicle communication line 280, the management information stored in each of the devices from each of the devices (the TCU 201, the ECU 204, the ECU 205, the ECU 206, the MID 298, and the IVI 299) set as the target of the program update. According to the present embodiment, the obtainment of the management information through the in-vehicle communication line 280 is referred to as an "in-vehicle configuration synchronization".

The management information includes version information and identification information of each of the devices. The version information may include software version information of each of the devices. The version information may further include hardware version information of each of the devices. The identification information may include a serial number of each of the devices. The update control unit 220 stores the management information obtained from each of the devices in the internal memory of the ECU 202 in association with ID information assigned to the ECU.

The ECU 202 transmits the management information collected from each of the devices to the server 70 when the IG power source is turned on. The server 70 stores the management information of each of the devices which is received from the vehicle 20. The server 70 determines whether the program update of each of the devices can be performed based on the management information received from the vehicle 20, and transmits the presence notification of the update program to the vehicle 20 when the program update of each of the devices can be performed. For example, when an update program of a software version newer than the current software version of the management information is present, the presence notification of the update program is transmitted to the vehicle 20. When the presence notification of the update program is received, the update control unit 220 receives the update program from the server 70. In this manner, the server 70 determines the presence of the update program based on the management information received from the vehicle 20. The management information is one example of information necessary to the program update of the device included in the control system 200.

It should be noted that in a case where the diagnosis apparatus 30 is connected to the in-vehicle communication line 280 when the IG power source is turned on, the ECU 202 transmits information on the absence of the management information to the server 70 without performing the in-vehicle configuration synchronization. According to the present embodiment, the transmission of the management information to the server 70 or the transmission of the information on the absence of the management information is referred to as an "external configuration synchronization".

Figure 4:
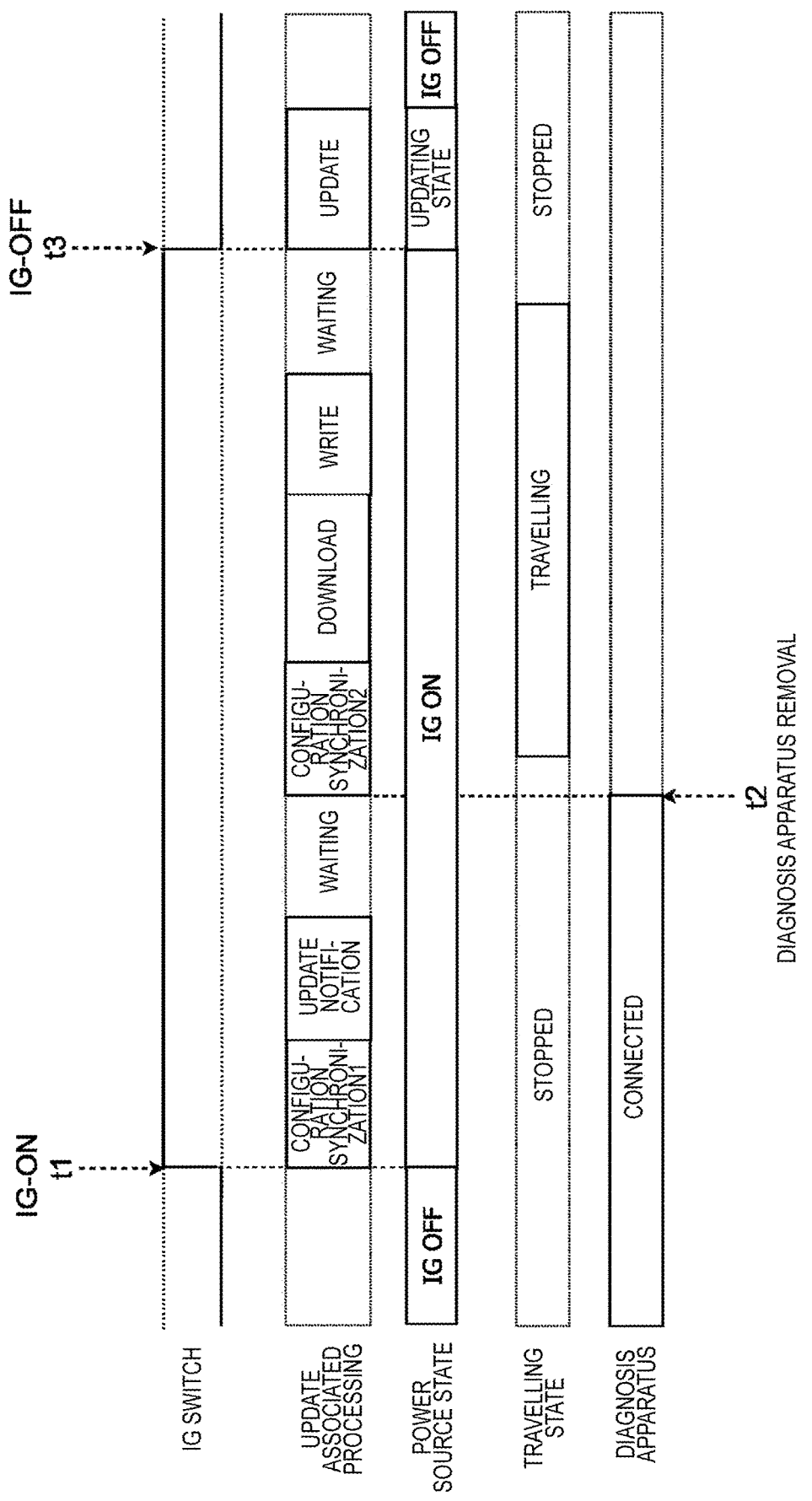
FIG. 4 schematically illustrates one example of a time chart related to program update processing.

FIG. 4 schematically illustrates one example of a time chart related to the program update processing. FIG. 4 illustrates a state of an IG switch, an execution state of update associated processing, a power source state, a travelling state of the vehicle 20, and a connection state of the diagnosis apparatus 30. The time chart of FIG. 4 is a time chart in a case where the diagnosis apparatus 30 is connected to the diagnosis port 34 before the IG switch is turned on. It should be noted that the device set as the target of the program update is the ECU 205.

At time point t1, when the IG switch is turned off by the user, the update control unit 220 performs the configuration synchronization. At this time, when it is detected that the diagnosis apparatus 30 is connected to the in-vehicle communication line 280, the update control unit 220 performs only the external configuration synchronization without performing the in-vehicle configuration synchronization (configuration synchronization 1). In this case, the server 70 determines the presence of the update program based on the management information stored in the server 70, and transmits the presence notification to the vehicle 20 when the update program is present. When the presence notification is received from the server 70, the update control unit 220 notifies the user of the presence of the update program, and also notifies the user that the diagnosis apparatus 30 is to be removed from the diagnosis port 34 (update notification) to suspend the update processing (waiting).

At time point t2, when the removal of the diagnosis apparatus 30 from the diagnosis port 34 is sensed, the update control unit 220 performs the in-vehicle configuration synchronization and the external configuration synchronization (configuration synchronization 2), and downloads the update program from the server 70 (download). When the download is completed, the update control unit 220 writes the update program to the ECU 205 set as the target of the program update (write). It should be noted that since the internal memory for storing the firmware is the double-bank memory, the ECU 205 can execute the write of the update program to the ECU 205 while the vehicle 20 is travelling.

At time point t3, when the IG switch is turned off, the update control unit 220 checks that the diagnosis apparatus 30 is not connected to the diagnosis port 34, and executes the program update of the ECU 205 (update). The processing executed in this program update is the activation of the above described update program. It should be noted that when the program update is to be executed, the power source state of the device necessary to execute the program update is turned on, and the power source state of other devices is turned off (updating state). When the program update is completed, the IG power source is put into an off state.

As illustrated in the time chart of FIG. 4, in a case where the diagnosis apparatus 30 is connected to the diagnosis port 34 when the IG power source is turned on, the processing for receiving the update program from the server 70, the processing for writing the update program, and the processing for activating the update program can be prohibited even when the update program is present. In addition, when the diagnosis apparatus 30 is removed from the diagnosis port 34, the update program can be received after the configuration synchronization including the in-vehicle configuration synchronization is executed again. Thus, by appropriately performing the in-vehicle configuration synchronization in a state where the diagnosis apparatus 30 is not connected to the diagnosis port 34, the appropriate update program can be received.

Figure 5:
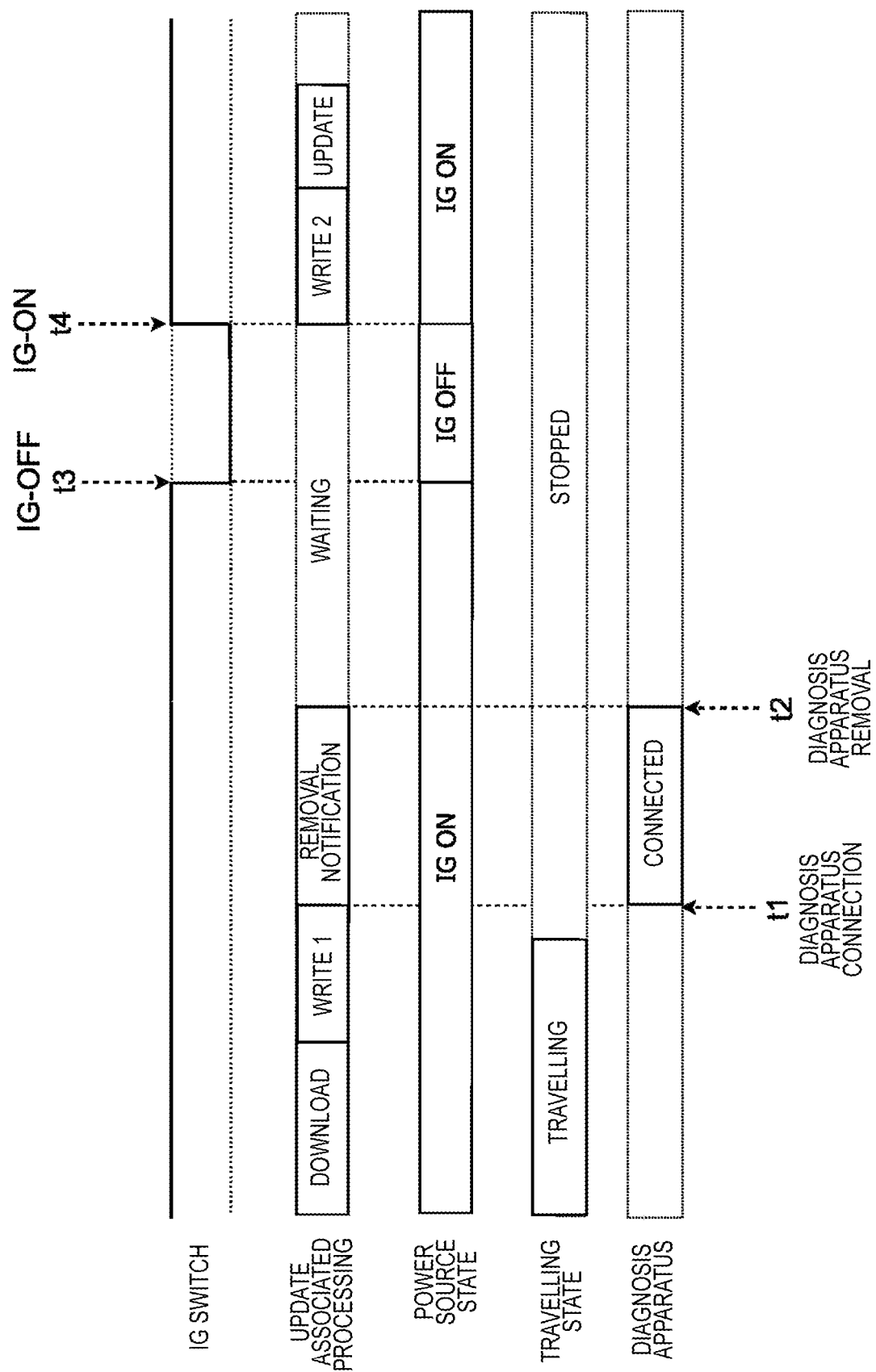
FIG. 5 schematically illustrates another example of the time chart related to the program update processing.

FIG. 5 schematically illustrates another example of the time chart related to the program update processing. Similarly as in FIG. 4, FIG. 5 illustrates the state of the IG switch, the execution state of the update associated processing, the power source state, the travelling state of the vehicle 20, and the connection state of the diagnosis apparatus 30. The time chart of FIG. 5 is a time chart in a case where the diagnosis apparatus 30 is connected to the diagnosis port 34 when the vehicle 20 is being started up. It should be noted that the device set as the target of the program update is the ECU 205.

At starting timing in the time chart of FIG. 5, the vehicle 20 is travelling, and is downloading the update program of the ECU 205. When the download is completed, the update control unit 220 writes the update program to the ECU 205 set as the target of the program update (write 1).

After the vehicle 20 stops, when the connection of the diagnosis apparatus 30 to the diagnosis port 34 during the write of the update program is sensed at the time point t1, the update control unit 220 suspends the write of the update program to the ECU 205, and requests the user to remove the diagnosis apparatus 30 (removal notification).

At the time point t2, when the removal of the diagnosis apparatus 30 from the diagnosis port 34 is sensed, the update control unit 220 stops the removal notification, and enters a waiting state to wait for start of the write of the update program.

In a case where the IG switch is turned off to put the IG power source into the off state at time point t3 and the IG switch is turned on at time point t4, the update control unit 220 checks that the diagnosis apparatus 30 is not connected to the diagnosis port 34 and resumes the write of the update program to the ECU 205 (write 2), and when the write of the update program is completed, executes the program update of the ECU 205 (update). The processing executed in this program update is the activation of the above described update program. When the program update of the ECU 205 is completed, the vehicle 20 is put into a state where travelling is ready.

Figure 6:
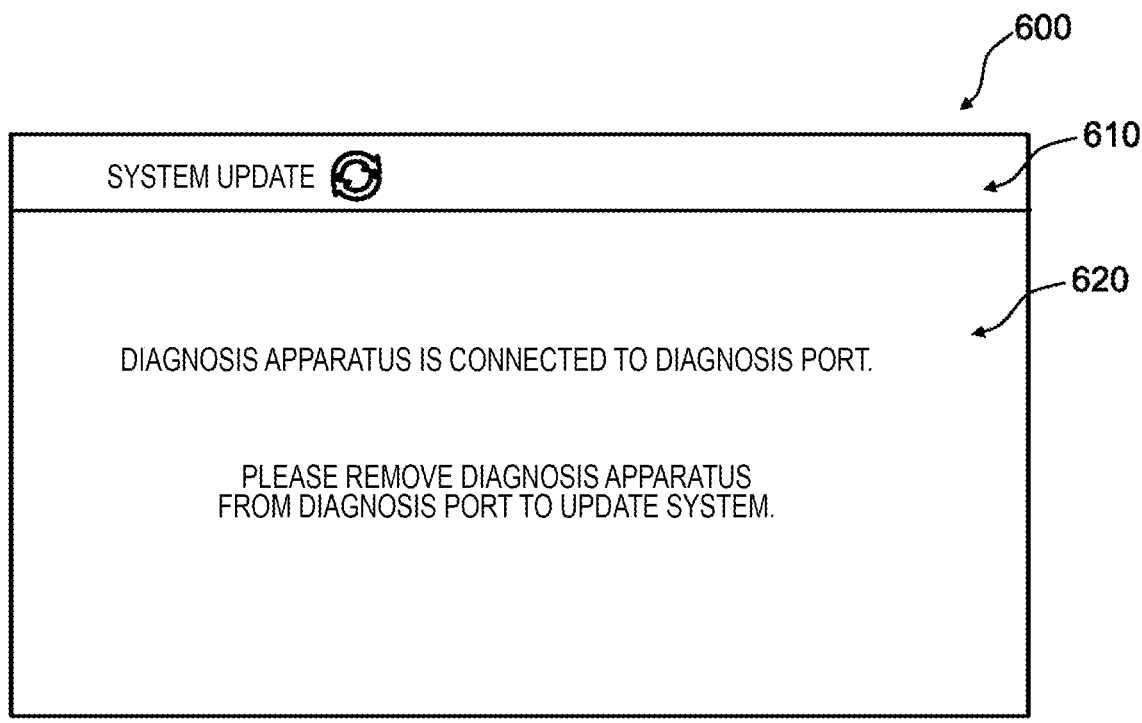
FIG. 6 illustrates one example of user notification information 600 displayed on an IVI 299.

FIG. 6 illustrates one example of user notification information 600 displayed on the IVI 299. When the connection of the diagnosis apparatus 30 to the diagnosis port 34 is sensed, the update control unit 220 causes the IVI 299 to display the user notification information 600. The user notification information 600 is displayed during an "update notification" period in the time chart of FIG. 4. In addition, the user notification information 600 is displayed during a "removal notification" period in the time chart of FIG. 5.

The user notification information 600 includes notification information 610 and notification information 620 to the user. The notification information 610 indicates the presence of the update program. The notification information 620 is information to indicate that the connection of the diagnosis apparatus 30 is to be released. The notification information 620 may be information to indicate that the diagnosis by the diagnosis apparatus 30 is to be stopped. The update control unit 220 may cause the IVI 299 to display the user notification information 600 while the diagnosis apparatus 30 is connected to the diagnosis port 34. The update control unit 220 may cause the IVI 299 to reproduce contents of the notification information 620 by a sound.

Figure 7:
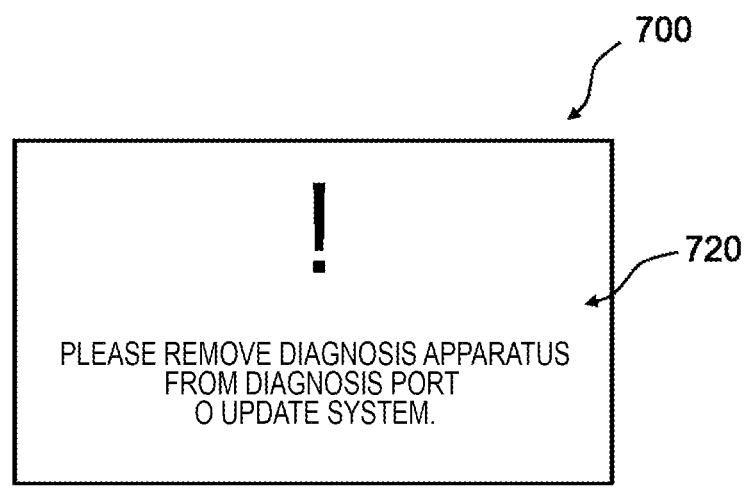
FIG. 7 illustrates one example of user notification information 700 displayed on an MID 298.

FIG. 7 illustrates one example of user notification information 700 displayed on the MID 298. When the connection of the diagnosis apparatus 30 to the diagnosis port 34 is sensed, the update control unit 220 causes the MID 298 to display the user notification information 700. The user notification information 700 is displayed during the "update notification" period in the time chart of FIG. 4. In addition, the user notification information 700 is displayed during the "removal notification" period in the time chart of FIG. 5.

The user notification information 700 includes the notification information 720 to the user. The notification information 720 is information to indicate that the connection of the diagnosis apparatus 30 is to be released. The notification information 720 may be information to indicate that the diagnosis by the diagnosis apparatus 30 is to be stopped. The update control unit 220 may cause the MID 298 to display the user notification information 700 while the diagnosis apparatus 30 is connected to the diagnosis port 34.

The update control unit 220 displays the user notification information through the MID 298 in addition to the IVI 299. Thus, the user can be caused to certainly recognize that it is necessary to release the connection of the diagnosis apparatus 30 to perform the update program. For example, even if the IVI 299 breaks down, it is possible to notify the user of that effect through the MID 298.

It should be noted that under conditions that a speed of the vehicle 20 is 0 and also that a shift position is at a parking position, the update control unit 220 may display the user notification information 600 and the user notification information 720. Thus, the notification can be appropriately performed at timing at which the user can remove the diagnosis apparatus 30.

Figure 8:
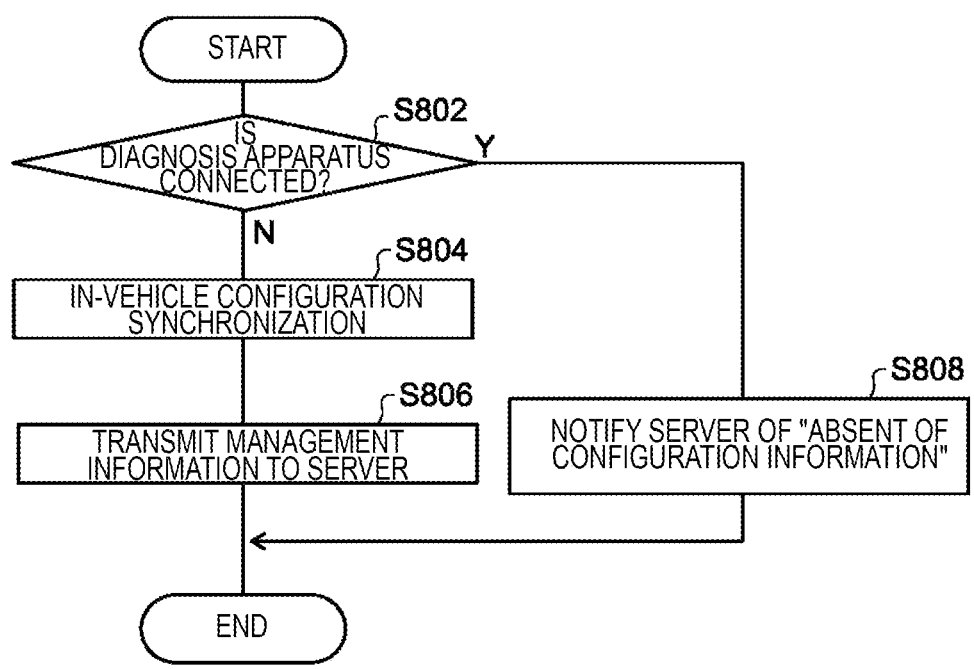
FIG. 8 is a flow chart illustrating one example of an execution procedure of processing related to program update.

FIG. 8 is a flow chart illustrating one example of an execution procedure of processing related to the program update. The processing in the flow chart of FIG. 8 is started when the IG switch is turned on. The flow chart of FIG. 8 illustrates processing until the configuration synchronization is to be executed after the IG power source is turned on in response to an on operation of the IG switch.

In S802, the update control unit 220 determines whether the diagnosis apparatus 30 is connected to the diagnosis port 34. The update control unit 220 may determine whether the diagnosis apparatus 30 is connected to the diagnosis port 34 based on a signal state of the in-vehicle communication line 280. The update control unit 220 may determine whether the diagnosis apparatus 30 is connected to the diagnosis port 34 during a period until a predetermined time period elapses since the IG switch is turned on.

When the diagnosis apparatus 30 is not connected to the diagnosis port 34, in S804, the update control unit 220 performs the in-vehicle configuration synchronization. Subsequently, in S806, the update control unit 220 transmits the management information obtained by the in-vehicle configuration synchronization in S804 to the server 70 (external configuration synchronization). When it is determined in the determination in S802 that the diagnosis apparatus 30 is connected to the diagnosis port 34, in S808, the update control unit 220 transmits information indicating the "absence of configuration information" to the server 70.

It should be noted that FIG. 8 is the flow chart in a case where the program update processing in a suspended state is not present when the IG power source is turned on. For example, as described in association with FIG. 4, when the write of the update program to the ECU 205 is suspended before the IG switch is turned on, the program update processing is in the suspended state. In this case, under a condition that the diagnosis apparatus 30 is not connected to the diagnosis port 34, the update control unit 220 resumes the program update processing. For example, the update control unit 220 resumes the write of the update program to the ECU 205. On the other hand, when the diagnosis apparatus 30 is connected to the diagnosis port 34, the update control unit 220 performs the user notification indicating that the diagnosis apparatus 30 is to be removed from the diagnosis port 34. For example, the update control unit 220 causes the IVI 299 to display the user notification information 700, and also causes the MID 298 to display the user notification information 600.

Figure 9:
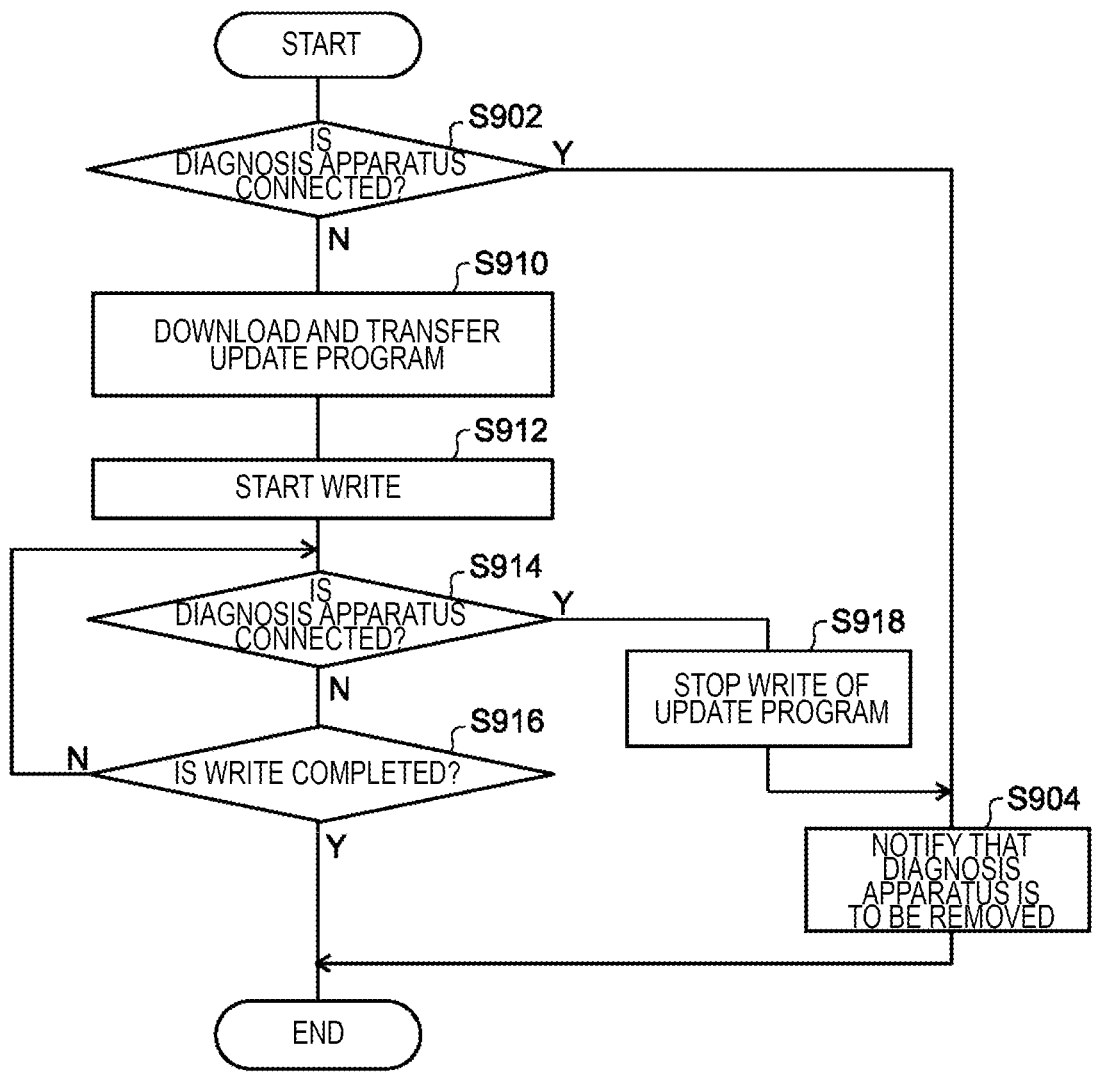
FIG. 9 is a flow chart illustrating one example of the execution procedure of the processing related to the program update.

FIG. 9 is a flow chart illustrating one example of the execution procedure of the processing related to the program update. The processing in the flow chart of FIG. 9 is processing in a case where presence notification information of the update program is received from the server 70.

When the presence notification information of the update program is received from the server 70, in S902, the update control unit 220 determines whether the diagnosis apparatus 30 is connected to the diagnosis port 34. When the diagnosis apparatus 30 is connected to the diagnosis port 34, the flow shifts to S904, and when the diagnosis apparatus 30 is not connected to the diagnosis port 34, the flow shifts to S910.

In S904, the update control unit 220 performs the user notification to indicate that the diagnosis apparatus 30 is to be removed from the diagnosis port 34, and ends the processing in this flow chart. In S904, the update control unit 220 causes, for example, the IVI 299 to display the user notification information 700, and also causes the MID 298 to display the user notification information 600. Thus, even when the diagnosis apparatus 30 is connected to the diagnosis port 34, since it is possible to notify the user of the presence of the update program, a situation can be avoided where an important update program is left unchecked for a long period of time in a state the update program is not applied thereto.

When it is determined in the determination in S902 that the diagnosis apparatus 30 is not connected to the diagnosis port 34, in S910, the update control unit 220 downloads and transfers update data including the update program from the server 70 to the ECU 205 set as the target of the program update.

When the transfer of the update program is completed, in S912, the update control unit 220 instructs the ECU 205 to write the transferred update program to the ECU 205. In S914, it is determined as to whether the diagnosis apparatus 30 is connected to the diagnosis port 34. When the diagnosis apparatus 30 is not connected to the diagnosis port 34, the flow shifts to S916, and when the diagnosis apparatus 30 is connected to the diagnosis port 34, the flow shifts to S918.

In S916, the update control unit 220 determines whether the write of the update program is completed. When a notification to indicate that the write of the update program is completed is received from the ECU 205 through the in-vehicle communication line 280, the update control unit 220 determines that the write of the update program is completed. When the write of the update program is not completed, the flow shifts to S914, and when the write of the update program is completed, the processing in this flow chart is ended.

When it is determined in S914 that the diagnosis apparatus 30 is connected to the diagnosis port 34, in S918, the update control unit 220 instructs the ECU 205 to stop the write of the update program, and the flow shifts to S904.

Figure 10:
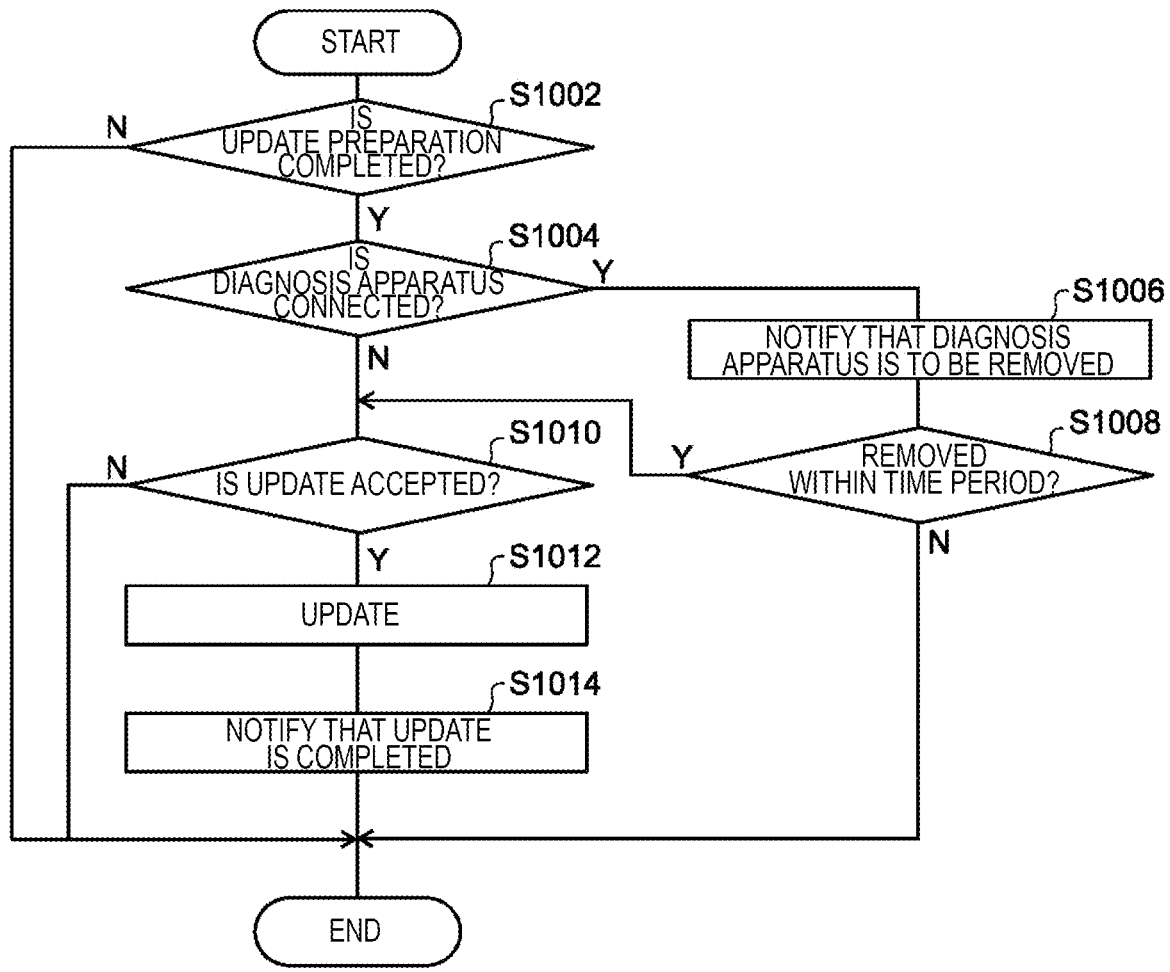
FIG. 10 is a flow chart illustrating one example of the execution procedure of the processing related to the program update.

FIG. 10 is a flow chart illustrating one example of the execution procedure of the processing related to the program update. The processing in the flow chart of FIG. 10 is started when the IG switch is turned off.

In S1002, the update control unit 220 determines whether an update preparation is completed. For example, when the notification to indicate that the write of the update program is completed is received from the ECU 205 before the IG switch is turned off, the update control unit 220 determines that the update preparation is completed. When the update preparation is not completed, the processing in this flow chart is ended. When the update preparation is completed, in S1004, it is determined as to whether the diagnosis apparatus 30 is connected to the diagnosis port 34. When the diagnosis apparatus 30 is connected to the diagnosis port 34, the flow shifts to S1006, and when the diagnosis apparatus 30 is not connected to the diagnosis port 34, the flow shifts to S1010.

When the diagnosis apparatus 30 is not connected to the diagnosis port 34, in S1010, it is determined as to whether an execution of an system update is accepted by the user. For example, the update control unit 220 causes the IVI 299 to display a screen for accepting an user instruction to execute the system update, and when the user instruction to execute the system update is obtained from the IVI 299, it is determined that the execution of the system update is accepted from the user. When the execution of the system update is not accepted from the user, the processing in this flow chart is ended.

When the execution of the system update is accepted from the user, in S1012, the ECU 205 is instructed to start the program update of the ECU 205. When the notification to indicate that the program update is completed is received from the ECU 205 through the in-vehicle communication line 280, the update control unit 220 notifies the server 70 of the completion of the program update in S1014, and ends the processing in this flow chart.

When it is determined in S1004 that the diagnosis apparatus 30 is connected to the diagnosis port 34, in S1006, the update control unit 220 performs the user notification to indicate that the diagnosis apparatus 30 is to be removed from the diagnosis port 34, and ends the processing in this flow chart. In S1006, the update control unit 220 causes, for example, the IVI 299 to display the user notification information 700, and also causes the MID 298 to display the user notification information 600.

Subsequently, in S1008, the update control unit 220 determines whether the diagnosis apparatus 30 is removed from the diagnosis port 34 within a predetermined time period. When the diagnosis apparatus 30 is removed from the diagnosis port 34 within the predetermined time period, the flow shifts to S1010, and when the diagnosis apparatus 30 is not removed from the diagnosis port 34 within the predetermined time period, the processing in this flow chart is ended. When the processing in this flow chart is ended, the IG power source state of the vehicle 20 turns to off.

As described above, in accordance with the control of the control system 200 according to the present embodiment, in a case where the program update is to be executed, when some sort of the diagnosis apparatus is connected to the diagnosis port 34, the program update of the ECU is restricted. Thus, the probability that the program update is interfered by the commercially available scanning tool can be reduced. In addition, when processing is to be performed where it is necessary to interrupt a communication with the outside through the diagnosis port 34 as in the program update, the program update of the ECU is stopped, and the notification of the removal of the diagnosis apparatus 30 is performed, so that convenience of the user is increased since the use of the diagnosis port 34 is not prohibited at a normal time.

It should be noted that according to the embodiment described above, the specific example has been mainly described in a case where the program update is restricted when the diagnosis apparatus is connected to the diagnosis port 34. In contrast to this, in a case where the program update is to be performed, the diagnosis by the diagnosis apparatus may be restricted when the diagnosis apparatus is connected to the diagnosis port 34. For example, the restriction control unit 250 may prohibit a communication with the diagnosis apparatus by each of the devices in the control system 200. In addition, the restriction control unit 250 may disconnect a communication line between the diagnosis port 34 and the in-vehicle communication line 280. For example, a switching circuit configured to switch connection and disconnection between the diagnosis port 34 and the in-vehicle communication line 280 may be provided at a connecting point between the diagnosis port 34 and the in-vehicle communication line 280, and a communication line between the diagnosis port 34 and the in-vehicle communication line 280 may be disconnected by the switching circuit.

It should be noted that the vehicle 20 is a vehicle as one example of a transport device. The vehicle may be a motor vehicle such as a motor vehicle including an internal combustion engine, an electric motor vehicle, or a fuel cell motor vehicle (FCV). The motor vehicle includes a bus, a truck, a two-wheel motor vehicle, or the like. The vehicle may be a saddle type vehicle or the like, and may be a motorbike. Examples of the transport device include a device such as aircraft including an unmanned aircraft or a ship in addition to the vehicle. The transport device may be any device configured to transport a person or an article. The transport device is one example of the movable object. The movable object is not limited to the transport device, and may be any movable device.

Figure 11:
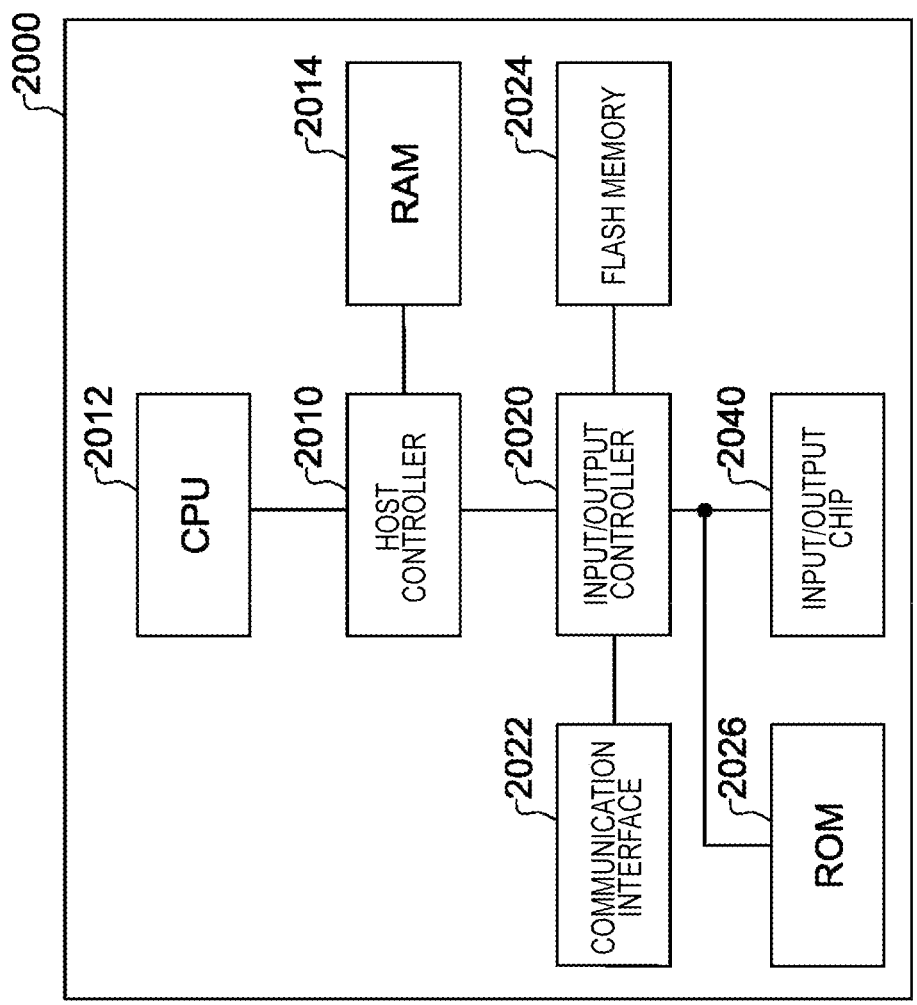
FIG. 11 illustrates an example of a computer 2000.

FIG. 11 illustrates an example of a computer 2000 where a plurality of embodiments of the present invention may be entirely or partially embodied. Programs installed in the computer 2000 can cause the computer 2000 to: function as systems such as the control system according to the embodiments, apparatuses, or each unit of the apparatuses; execute operations associated with the apparatuses or each unit of the apparatuses; and/or execute a process according to the embodiments or steps of the process. Such programs may be executed by a central processing unit (CPU) 2012 in order to cause the computer 2000 to execute a specific operation associated with some or all of the processing procedures and the blocks in the block diagram described in this specification.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to the programs stored in the ROM 2026 and the RAM 2014, thereby controlling each unit.

The communication interface 2022 communicates with other electronic devices via a network. The flash memory 2024 stores the programs and data used by the CPU 2012 in the computer 2000. The ROM 2026 stores a boot program or the like executed by the computer 2000 during activation, and/or a program depending on hardware of the computer 2000. The input/output chip 2040 may also connect various input/output units such as a keyboard, a mouse, and a monitor, to the input/output controller 2020 via input/output ports such as a serial port, a parallel port, a keyboard port, a mouse port, a monitor port, a universal serial bus (USB) port, a high-definition multimedia interface (HDMI (registered trademark)) port.

The programs are provided via a network or a computer readable storage medium such as a CD-ROM, a DVD-ROM, or a memory card. The RAM 2014, the ROM 2026, or the flash memory 2024 is an example of the computer readable storage medium. The programs are installed in the flash memory 2024, the RAM 2014 or the ROM 2026, and are executed by the CPU 2012. Information processing written in these programs is read by the computer 2000, and provides cooperation between the programs and the various types of hardware resources described above. An apparatus or a method may be configured by implementing operation or processing of information according to a use of the computer 2000.

For example, when communication is performed between the computer 2000 and an external device, the CPU 2012 may execute a communication program loaded in the RAM 2014, and instruct the communication interface 2022 to execute communication processing, based on processing written in the communication program. The communication interface 2022, under the control of the CPU 2012, reads transmission data stored in a transmission buffer processing region provided in a recording medium such as the RAM 2014 and the flash memory 2024, sends the read transmission data to the network, and writes reception data received from the network into a reception buffer processing region or the like provided on the recording medium.

Moreover, the CPU 2012 may cause all or necessary portion of a file or a database stored in the recording medium such as the flash memory 2024 or the like, to be read by the RAM 2014, and execute various types of processing on the data on the RAM 2014. Next, the CPU 2012 writes back the processed data into the recording medium.

Various types of programs and various types of information such as data, a table, and a database may be stored in the recording medium, and subjected to information processing. The CPU 2012 may execute, on the data read from the RAM 2014, various types of processing including various types of operations, information processing, conditional judgement, conditional branching, unconditional branching, information retrieval/replacement, or the like described in this specification and specified by instruction sequences of the programs, and writes back the results into the RAM 2014. Moreover, the CPU 2012 may retrieve information in a file, a database, or the like in the recording medium. For example, when a plurality of entries each having an attribute value of a first attribute associated with an attribute value of a second attribute is stored in the recording medium, the CPU 2012 may retrieve, out of the plurality of entries, an entry with the attribute value of the first attribute specified that meets a condition, read the attribute value of the second attribute stored in the entry, and thereby acquire the attribute value of the second attribute associated with the first attribute meeting a predetermined condition.

The programs or software module described above may be stored on the computer 2000 or in a computer readable storage medium near the computer 2000. A recording medium such as a hard disk or a RAM provided in a server system connected to a dedicated communication network or the Internet can be used as the computer readable storage medium. The programs stored in the computer readable storage medium may be provided to the computer 2000 via the network.

The program that is installed in the computer 2000 and causes the computer 2000 to function as the control system 200 may instruct a processor such as the CPU 2012 to cause the computer 2000 to function as each unit of the control system 200. The information processing written in these programs are read by the computer 2000 to cause the computer to function as each unit of the control system 200, which is specific means realized by the cooperation of software and the various types of hardware resources described above. Then, these specific means implement operations or processing of information according to the intended use of the computer 2000 in the present embodiment, so that the control system 200 is constructed as a specific information processing apparatus according to the intended use.

Various embodiments have been described with reference to the block diagram or the like. In the block diagram, each block may represent (1) a step of a process in which an operation is executed, or (2) each unit of the apparatus having a role in executing the operation. Specific steps and each unit may be implemented by dedicated circuitry, a programmable circuit supplied along with a computer readable instruction stored on a computer readable storage medium, and/or a processor supplied along with the computer readable instruction stored on the computer readable storage medium. The dedicated circuitry may include a digital and/or analog hardware circuit, or may include an integrated circuit (IC) and/or a discrete circuit. The programmable circuit may include a reconfigurable hardware circuit including: logical AND, logical OR, logical XOR, logical NAND, logical NOR, and other logical operations; a memory element such as a flip-flop, a register, a field programmable gate array (FPGA), a programmable logic array (PLA), or the like; and so on.

The computer readable storage medium may include any tangible device capable of storing an instruction executed by an appropriate device, so that the computer readable storage medium having the instruction stored thereon constitutes at least a part of a product including an instruction that may be executed in order to provide means to execute an operation specified by a processing procedure or a block diagram. Examples of the computer readable storage medium may include an electronic storage medium, a magnetic storage medium, an optical storage medium, an electromagnetic storage medium, a semiconductor storage medium, or the like. More specific examples of the computer readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

Computer readable instructions may include either of source code or object code written in any combination of one or more programming languages including: an assembler instruction, an instruction-set-architecture (ISA) instruction, a machine instruction, a machine dependent instruction, a microcode, a firmware instruction, state-setting data; or an object oriented programming language such as Smalltalk (registered trademark), JAVA (registered trademark), C++, or the like; and a conventional procedural programming language such as a "C" programming language or a similar programming language.

Computer readable instructions may be provided to a processor of a general purpose computer, special purpose computer, or other programmable data processing device, or to a programmable circuit, locally or via a local area network (LAN), wide area network (WAN) such as the Internet, etc. and the computer readable instruction may be executed in order to provide means to execute operations specified by the described processing procedure or the block diagram. Examples of processors include computer processors, processing units, microprocessors, digital signal processors, controllers, microcontrollers, etc.

While the embodiments of the present invention have been described, the technical scope of the invention is not limited to the above described embodiments. It is apparent to persons skilled in the art that various alterations and improvements can be added to the above described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to", "before", or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 10 update system; 20 vehicle; 30 diagnosis apparatus; 32 cable; 34 diagnosis port; 70 server; 90 communication network; 200 control system; 201 TCU; 202 ECU; 204 ECU; 205 ECU; 206 ECU; 220 update control unit; 250 restriction control unit; 280 in-vehicle communication line; 294 FI; 295 battery; 296 air conditioning device; 298 MID; 299 IVI; 600 user notification information; 610 notification information; 620 notification information; 700 user notification information; 720 notification information; 2000 computer; 2010 host controller; 2012 CPU; 2014 RAM; 2020 input/output controller; 2022 communication interface; 2024 flash memory; 2026 ROM; 2040 input/output chip

What is claimed is:

1. A control system comprising:
   at least one memory and
   at least one processor configured to:
   control a movable object; and
   control a program update of the movable object;
   a communication path that is a path to perform the program update, wherein a path that connects an external diagnosis scanner to an onboard diagnostics (OBD) system of the movable object via an onboard diagnostics (OBD) port configured to perform a diagnosis of the movable object and used for transmitting information of the movable object to the external diagnosis scanner from the OBD system via the OBD port and the communication path are at least partially in common; and
   the at least one processor is further configured to
   restrict, when the program update and the diagnosis of the movable object by the external diagnosis scanner are to be performed, one of the diagnosis by the external diagnosis scanner and the program update;
   wherein the program update is received via wireless communication from a server external to the movable object.

2. The control system according to claim 1, wherein when the program update and the diagnosis of the movable object by the external diagnosis scanner are to be performed, the at least one processor prohibits the program update until the diagnosis of the external diagnosis scanner is aborted.

3. The control system according to claim 2, wherein when the program update and the diagnosis by the external diagnosis scanner are to be performed, the at least one processor executes a user notification to indicate that the diagnosis by the external diagnosis scanner is stopped.

4. The control system according to claim 3, wherein
   at start up of the movable object, the at least one processor implements a configuration synchronization to obtain, through the communication path, management information that is information including at least a version of the program update, and
   when a connection of the external diagnosis scanner to the movable object is sensed at start up of the movable object, the at least one processor prohibits the configuration synchronization until the connection of the external diagnosis scanner is released.

5. The control system according to claim 3, wherein when a connection of the external diagnosis scanner to the movable object is sensed at start up of the movable object, the at least one processor prohibits a reception of an update program from the server configured to transmit the update program.

6. The control system according to claim 3, wherein
   the at least one processor performs a control to receive, from the server configured to transmit an update program, a presence notification of the update program, and
   when a connection of the external diagnosis scanner to the movable object is sensed at start up of the movable object, the at least one processor executes a user notification to indicate that the update program is present and a user notification to request for a release of the connection of the external diagnosis scanner.

7. The control system according to claim 3, wherein when a connection of the external diagnosis scanner to the movable object is sensed during write of an update program for the program update, the at least one processor suspends the write of the update program to the movable object control unit.

8. The control system according to claim 2, wherein
   at start up of the movable object, the at least one processor implements a configuration synchronization to obtain, through the communication path, management information that is necessary to the program update, and
   when a connection of the external diagnosis scanner to the movable object is sensed at start up of the movable object, the at least one processor prohibits the configuration synchronization until the connection of the external diagnosis scanner is released.

9. The control system according to claim 8, wherein when a connection of the external diagnosis scanner to the movable object is sensed at start up of the movable object, the at least one processor prohibits a reception of an update program from the server configured to transmit the update program.

10. The control system according to claim 8, wherein
    the at least one processor performs a control to receive, from the server configured to transmit an update program, a presence notification of the update program, and
    when a connection of the external diagnosis scanner to the movable object is sensed at start up of the movable object, the at least one processor executes a user notification to indicate that the update program is present and a user notification to request for a release of the connection of the external diagnosis scanner.

11. The control system according to claim 2, wherein when a connection of the external diagnosis scanner to the movable object is sensed at start up of the movable object, the at least one processor prohibits a reception of an update program from the server configured to transmit the update program.

12. The control system according to claim 11, wherein after a connection of the external diagnosis scanner to the movable object is sensed at start up of the movable object, when the connection of the external diagnosis scanner is released, the at least one processor to starts a reception of the update program from the server.

13. The control system according to claim 11, wherein
the at least one processor performs a control to receive, from the server configured to transmit an update program, a presence notification of the update program, and
when a connection of the external diagnosis scanner to the movable object is sensed at start up of the movable object, the at least one processor executes a user notification to indicate that the update program is present and a user notification to request for a release of the connection of the external diagnosis scanner.

14. The control system according to claim 2, wherein the at least one processor performs a control to receive, from the server configured to transmit an update program, a presence notification of the update program, and
when a connection of the external diagnosis scanner to the movable object is sensed at start up of the movable object, the at least one processor executes a user notification to indicate that the update program is present and a user notification to request for a release of the connection of the external diagnosis scanner.

15. The control system according to claim 2, wherein when a connection of the external diagnosis scanner to the movable object is sensed during write of an update program for the program update, the at least one processor to suspends the write of the update program.

16. The control system according to claim 15, wherein when a connection of the external diagnosis scanner to the movable object is sensed during write of the update program the at least one processor further executes a user notification to request for a release of the connection of the external diagnosis scanner.

17. A movable object comprising the control system according to claim 1.

18. The movable object according to claim 17, wherein the movable object is a vehicle.

19. A control method executed by a control system, the control system including a movable object control unit that uses at least one processor to control a movable object, an update control unit that uses the at least one processor to control a program update of the movable object control unit configured to control the movable object, and a communication path that is a path to perform the program update, wherein a path that is connects an external diagnosis scanner to an onboard diagnostics (OBD) system of the movable object via an onboard diagnostics (OBD) port configured to perform a diagnosis of the movable object and used for transmitting information of the movable object to the external diagnosis scanner from the OBD system via the OBD port and the communication path are at least partially in common, the control method comprising:
restricting, when the program update and the diagnosis of the movable object control unit by the external diagnosis scanner are to be performed, one of the diagnosis by the external diagnosis scanner and the program update; wherein the program update is received via wireless communication from a server external to the movable object.

20. A non-transitory computer readable storage medium having stored thereon a program, the program causing a computer including at least one processor to function as
a movable object control unit that uses the at least one processor to control a movable object, and
an update control unit that uses the at least one processor to control a program update of the movable object control unit, wherein
the computer includes a communication path that is a path to perform the program update and an information communication, and
a path that connects an external diagnosis scanner to an onboard diagnostics (OBD) system of the movable object via an onboard diagnostics (OBD) port configured to perform a diagnosis of the movable object and used for transmitting information of the movable object to the external diagnosis scanner from the OBD system via the OBD port and the communication path are at least partially in common,
the program causing the computer to function as:
a restriction control unit that uses the at least one processor to restrict, when the program update and the diagnosis of the movable object control unit by the external diagnosis scanner are to be performed, one of the diagnosis by the external diagnosis scanner and the program update;
wherein the program update is received via wireless communication from a server external to the movable object.

* * * * *